(12) United States Patent
Demland

(10) Patent No.: US 8,915,689 B2
(45) Date of Patent: Dec. 23, 2014

(54) RELEASABLE LOCK NUT ASSEMBLIES AND METHODS OF ASSEMBLING

(75) Inventor: Lance Nelson Demland, Wauseon, OH (US)

(73) Assignee: Pro Shear Corporation, Fort Wayne, IN (US)

( * ) Notice: Subject to any disclaimer, the term of this patent is extended or adjusted under 35 U.S.C. 154(b) by 245 days.

(21) Appl. No.: 13/480,020

(22) Filed: May 24, 2012

(65) Prior Publication Data

US 2012/0301245 A1 Nov. 29, 2012

Related U.S. Application Data

(60) Provisional application No. 61/489,710, filed on May 25, 2011.

(51) Int. Cl.
*F16B 43/00* (2006.01)

(52) U.S. Cl.
USPC ............................................. 411/533; 470/42

(58) Field of Classification Search
USPC ............ 411/326, 204, 211, 333, 533; 470/41, 470/42
IPC ....................................................... F16B 39/32
See application file for complete search history.

(56) References Cited

U.S. PATENT DOCUMENTS

| 588,346 | A | * | 8/1897 | Mireault | 411/330 |
| 2,966,187 | A | * | 12/1960 | Ter Cock Chars | 411/330 |
| 4,971,501 | A | * | 11/1990 | Chavez | 411/221 |
| 5,180,265 | A | * | 1/1993 | Wiese | 411/150 |
| 5,533,849 | A | * | 7/1996 | Burdick | 411/120 |
| 7,955,037 | B2 | * | 6/2011 | Disantis et al. | 411/330 |

\* cited by examiner

Primary Examiner — Gary Estremsky
(74) Attorney, Agent, or Firm — Dinsmore & Shohl LLP

(57) ABSTRACT

A releasable lock nut assembly for securing a bearing on a threaded hub may include a thrust washer including a disk portion and a peripheral skirt extending axially away from the disk portion, the peripheral skirt having a plurality of openings and a characteristic diameter measured at an axial location of the openings, and a protuberance proximate to at least one of the openings. The assembly may also include a lock ring inserted into the thrust washer, where the lock ring includes a plurality of tangs that extend beyond a lock ring major diameter such that the tangs fit within the openings of the thrust washer. The protuberance may be deformed such that all of the peripheral skirt is within the characteristic diameter, and the protuberance may define an internal envelope of the thrust washer where the internal envelope is larger than the major diameter of the lock ring.

10 Claims, 4 Drawing Sheets

US 8,915,689 B2

RELEASABLE LOCK NUT ASSEMBLIES AND METHODS OF ASSEMBLING

CROSS-REFERENCE TO RELATED APPLICATIONS

The present application claims prior to U.S. Provisional Patent Application Ser. No. 61/489,710, titled "Releasable Lock Nut Assemblies and Methods of Assembling" filed May 25, 2011.

TECHNICAL FIELD

The present specification generally relates to lock nuts and, more specifically, releasable lock nut assemblies for motor vehicles

BACKGROUND

With wheel assemblies for vehicles, there is a need to secure a wheel bearing to a spindle or a hub. As the complexity of wheel hubs increase, there is a desire to decrease the size of the nut and any associated locking feature that secures the wheel bearing to the spindle.

Accordingly, a need exists for alternative releasable lock nut assemblies.

SUMMARY

In one embodiment, a releasable lock nut assembly for securing a bearing on a threaded hub may include a thrust washer including a disk portion and a peripheral skirt extending axially away from the disk portion, the peripheral skirt having a plurality of openings and a characteristic diameter measured at an axial location of the openings, and a protuberance proximate to at least one of the openings. The releasable lock nut assembly may also include a lock ring inserted into the thrust washer, where the lock ring includes teeth on a side of the lock ring and a plurality of tangs that extend beyond a lock ring major diameter such that the tangs fit within the openings of the thrust washer. The lock ring may also include a biasing spring inserted into the thrust washer where the biasing spring forces the lock ring away from the disk portion of the thrust washer. The protuberance may be deformed such that all of the peripheral skirt is within the characteristic diameter, and the protuberance may define an internal envelope of the thrust washer where the internal envelope is larger than the major diameter of the lock ring.

In another embodiment, a method for assembling a releasable lock nut assembly may include inserting a biasing spring into a thrust washer, the thrust washer including a disk portion and a peripheral skirt extending axially away from the disk portion, the peripheral skirt having a plurality of openings and a characteristic diameter measured at an axial location of the openings, where the peripheral skirt is formed with a protuberance proximate to at least one of the openings. The method may further include inserting a lock ring into the thrust washer, the lock ring comprising teeth on a side of the lock ring and a plurality of tangs that extend beyond a lock ring major diameter such that the lock ring fits within the peripheral skirt of the thrust washer and the tangs fit within the openings of the thrust washer. The method may further include deforming the protuberance on the peripheral skirt such that all of peripheral skirt is within the characteristic diameter.

These and additional features provided by the embodiment described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
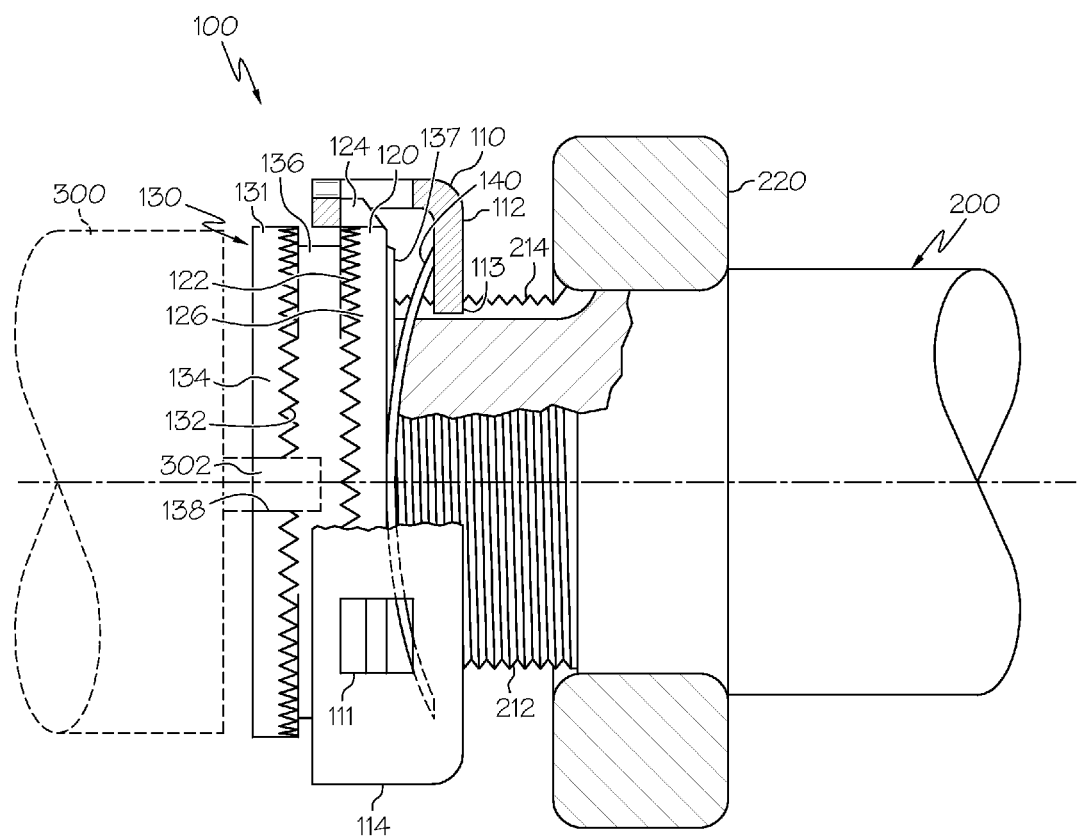
FIG. 1 schematically depicts a partial-sectional view of a releasable lock nut assembly according to one or more embodiments shown and described herein.
Figure 2:
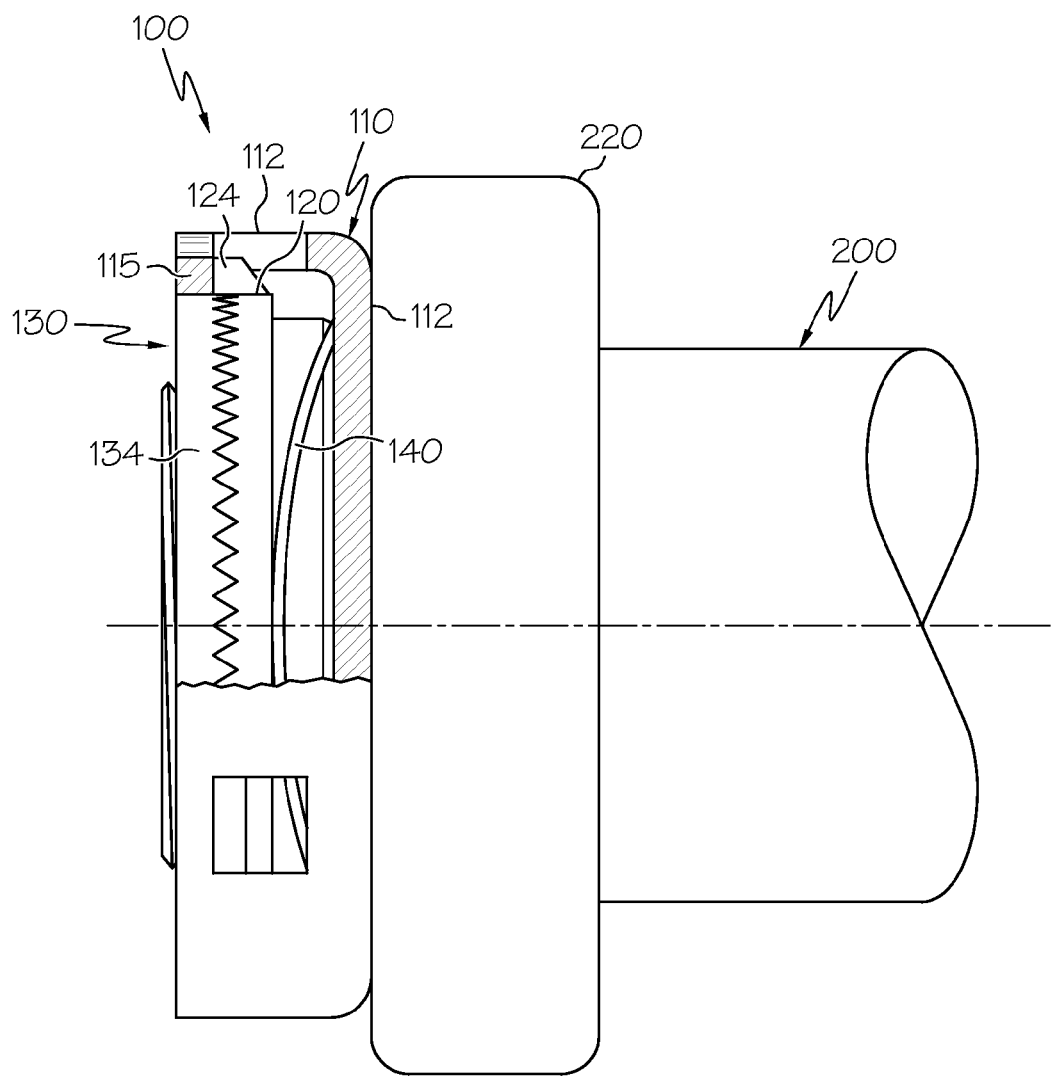
FIG. 2 schematically depicts a partial-sectional view of a releasable lock nut assembly according to one or more embodiments shown and described herein.

FIGS. 1 and 2 generally depicts a releasable lock nut assembly that may be used to retain a wheel bearing in a hub on a vehicle. The releasable lock nut assembly may include a thrust washer, a biasing spring, a lock ring, and a nut. The lock ring and the nut may have corresponding teeth on adjacent surfaces that, when mated together, prevent the nut from rotating relative to the lock ring. The thrust washer may have a plurality of openings along a peripheral skirt portion. The lock ring may have corresponding number of tangs that extend from the lock ring major diameter. The tangs on the lock ring may be inserted into the openings on the thrust washer such that the tangs and the openings prevent the lock ring from rotating relative to the thrust washer.

Figure 3:
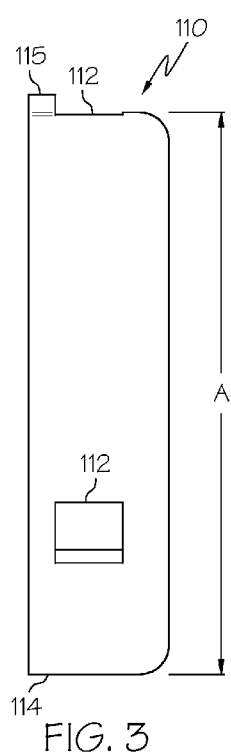
FIG. 3 schematically depicts a side view of a thrust washer according to one or more embodiments shown and described herein.
Figure 4:
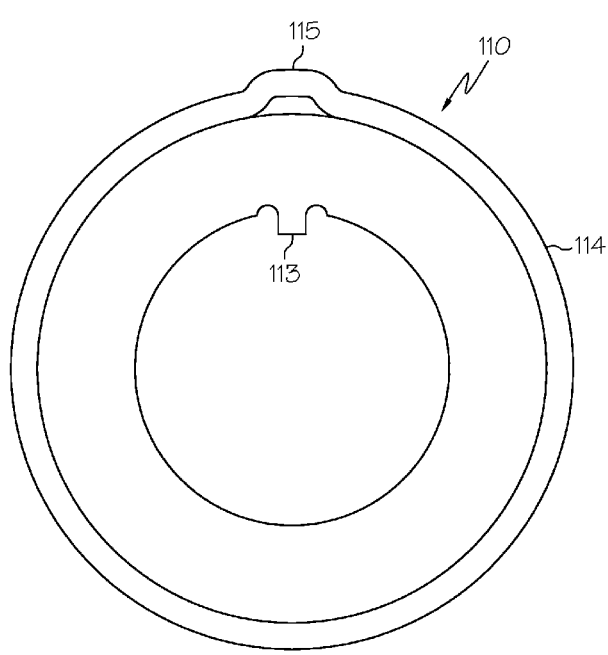
FIG. 4 schematically depicts a front view of a thrust washer according to one or more embodiments shown and described herein.
Figure 5:
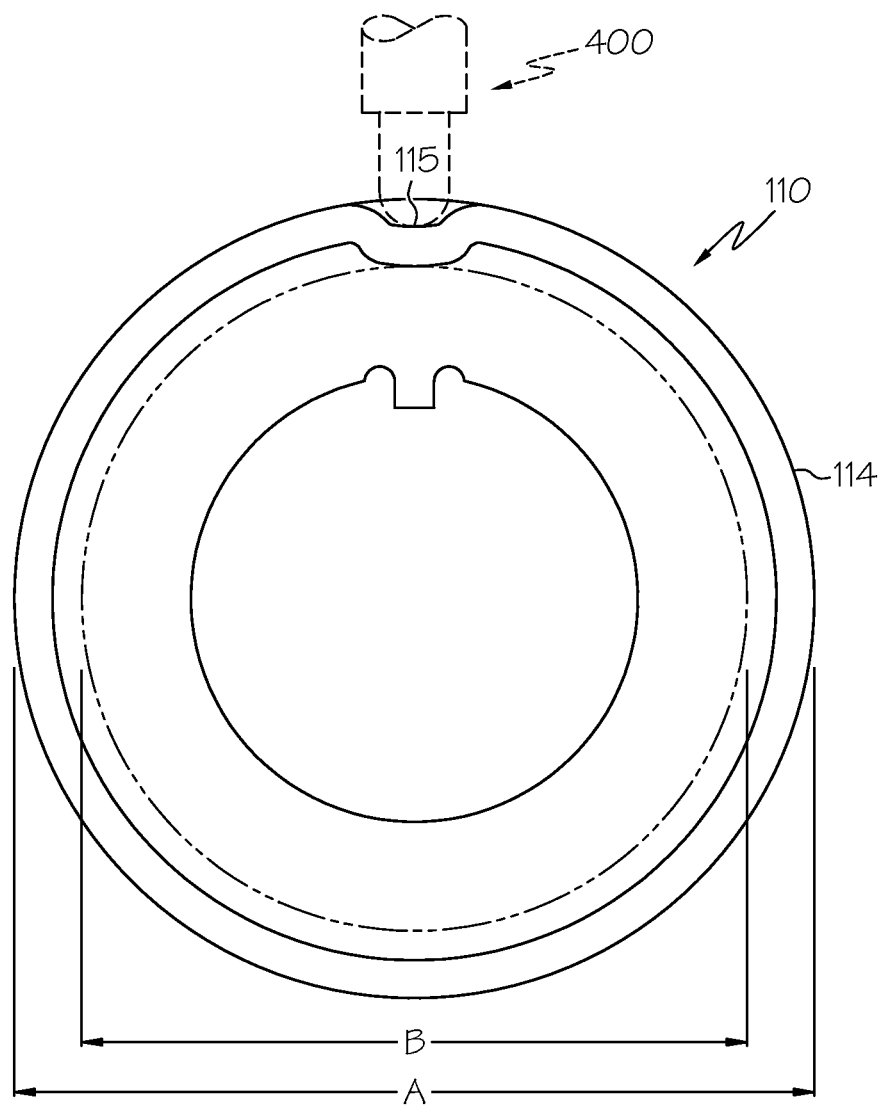
FIG. 5 schematically depicts a front view of a thrust washer according to one or more embodiments shown and described herein.

To prevent the lock ring from rotating relative to the thrust washer, the tangs must at least partially interfere with the thrust washer. As depicted in FIGS. 3-5, the thrust washer may be formed having a plurality of openings along the peripheral skirt portion, with a protuberance in the peripheral skirt portion proximate to at least one of the openings. The lock ring be inserted into the thrust washer such that the tangs extend into the openings. The protuberance may then be deformed inward such that all of the thrust washer lies within a characteristic diameter of the peripheral skirt.

Referring now to FIGS. 1 and 2 in detail, a releasable lock nut assembly 100 may be installed on a hub 200 of a vehicle to retain a wheel bearing 220 on the hub 200. The releasable lock nut assembly 100 may include a thrust washer 110, a lock ring 120, a nut 130, and a biasing spring 140. The thrust washer 110 may include a disk portion 112 having a key feature 113 and a peripheral skirt 114 extending axially away from the disk. The key feature 113 may slide through a keyway 214 cut through the axle threads 212 of the hub 200. The peripheral skirt 114 may have a plurality of openings 111 that pass through the peripheral skirt 114.

The lock ring 120 may include teeth 122 on one side of the lock ring 120 and a plurality of tangs 124 arranged on the outside of the lock ring 120 and extending from a major diameter 126 of the lock ring 120. The tangs 124 may be sized and arranged so that they fit within the openings 111 when the lock ring 120 is positioned inside the peripheral skirt 114 of the thrust washer 110.

The nut 130 may include a shoulder 131 having an outer diameter 134 and an inner body 136 that extends axially from the shoulder 131 and has threads along the inside. The threads on the inner body 136 may engage with the axle threads 212 on the hub 200. The nut 130 may also include teeth 132 on one side of the shoulder 131 that, when assembled with the lock ring 120, engage with the teeth 122 of the lock ring 120. The inner body 136 of the nut 130 may have an outside diameter that is less than an inner diameter of the lock ring 120 and an inner diameter of the biasing spring 140, such that the inner body 136 may pass through the lock ring 120 and the biasing spring 140. When assembled, the biasing spring 140 may apply a force to the disk portion 112 of the thrust washer 110 and to the lock ring 120 such that the teeth 122 on the lock ring 120 engage the teeth 132 on the nut 130. This engagement of teeth 122, 132 may lock the nut 130 to the lock ring 120, such that the nut 130 is prevented from rotating. To install the releasable lock nut assembly 100 onto a hub 200, a spanner 300 may be positioned such that prongs 302 on the spanner 300 pass through access slots 138 in the nut 130. The prongs 302 may apply a force to the lock ring 120 and depress the biasing spring 140 such that the teeth 122 on the lock ring 120 disengage from the teeth 132 on the nut 130. With the teeth 122, 132 disengaged, the nut 130 is unlocked from the lock ring 120, and may be free to rotate.

The nut 130 may also include a bearing face 137 disposed on the inner body 136 opposite the shoulder 131. When the releasable lock nut assembly 100 is assembled, the bearing face 137 may contact the disk portion 112 of the thrust washer 110. The threads on the inner body 136 of the nut 130 may be tightened against the axle threads 212, and the nut 130 may apply a force through the thrust washer 110 to the bearing 220.

Referring now to FIGS. 3 and 4, the thrust washer 110 may have a characteristic diameter A, or the outer diameter of the peripheral skirt 114 of the thrust washer 110 measured at an axial location of the openings 111. The thrust washer 110 may be formed with a protuberance 115 proximate to at least one of the openings 111. The protuberance 115 may be sized such that the lock ring 120 can be inserted into the thrust washer 110, such that the tangs 124 can be inserted into the openings 111. As initially formed, the protuberance 115 may extend outside the characteristic diameter A.

Once the lock ring 120 is installed in the thrust washer 110, the protuberance 115 on the peripheral skirt 114 may be deformed to retain the lock ring 120 in the thrust washer 110. As depicted in FIG. 5, with the lock ring 120 and the biasing spring 140 not illustrated for clarity, the protuberance 115 may be deformed such that the entire peripheral skirt 114 is within the characteristic diameter A. The protuberance 115 may be deformed using a crimp die 400. Because the tangs 124 on the lock ring 120 extend from the major diameter 126 of the lock ring 120, the lock ring 120 may be held captive within the thrust washer 110.

The deformed protuberance 115 may now define an internal envelope B of the thrust washer 110, or the largest diameter that can be accommodated within the peripheral skirt 114 while being concentric with the undeformed portion of the peripheral skirt 114. The internal envelope B of the thrust washer 110 may be larger than the major diameter 126 of the lock nut 120.

Referring to FIGS. 1 and 5, with the lock ring 120 secured in the thrust washer 110, the nut 130 can be installed into the thrust washer 110. The internal envelope B of the thrust washer 110 may be larger than the outer diameter 134 of the nut 130.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A releasable lock nut assembly for securing a bearing on a threaded hub comprising:
    a thrust washer comprising:
        a disk portion,
        a peripheral skirt extending axially away from the disk portion, the peripheral skirt having a plurality of openings that extend through the peripheral skirt, an integral hoop perimeter positioned away from the disk portion, and a characteristic diameter measured as the minimum external diameter of the peripheral skirt at an axial location of the openings, and
        a protuberance proximate to at least one of the openings;
    a lock ring inserted into the thrust washer, the lock ring comprising teeth on a side of the lock ring and a plurality of tangs that extend beyond a lock ring major diameter such that the tangs fit within the openings of the thrust washer; and
    a biasing spring inserted into the thrust washer, the biasing spring forces the lock ring away from the disk portion of the thrust washer,
wherein the protuberance is positioned such that all of the peripheral skirt is within the characteristic diameter, the protuberance defines an internal envelope of the thrust washer, the internal envelope is larger than the major diameter of the lock ring.

2. The releasable lock nut assembly of claim 1, further comprising a nut inserted into the thrust washer, the nut comprising a shoulder and an inner body, the shoulder having teeth on a side, the inner body extending axially from the shoulder and comprising threads along an inside and having a bearing face, the teeth on the shoulder engage the teeth on the lock ring, the threads engage with the threaded hub, and the bearing face applies a force to the disk portion of the thrust washer when the nut is tightened along the threaded hub.

3. A method for assembling a releasable lock nut assembly comprising:
    inserting a biasing spring into a thrust washer, the thrust washer comprising a disk portion and a peripheral skirt extending axially away from the disk portion, the peripheral skirt having a plurality of openings and a characteristic diameter measured at an axial location of the openings, wherein the peripheral skirt is formed with a protuberance proximate to at least one of the openings;
    inserting a lock ring into the thrust washer, the lock ring comprising teeth on a side of the lock ring and a plurality of tangs that extend beyond a lock ring major diameter such that the lock ring fits within the peripheral skirt of the thrust washer and the tangs fit within the openings of the thrust washer; and deforming the protuberance on the peripheral skirt such that all of the peripheral skirt is within the characteristic diameter.

4. The method of claim 3, wherein the protuberance is deformed using a crimp die.

5. The method of claim 3, wherein an internal envelope of the thrust washer is larger than the lock ring major diameter.

6. The method of claim 5, further comprising inserting a nut into the thrust washer such that a bearing face of the nut contacts the disk portion of the thrust washer, the nut comprising teeth that correspond with the teeth on the lock ring and a plurality of access slots that provide access to the lock ring.

7. The method of claim 6, wherein the internal envelope of the thrust washer is larger than an outer diameter of the nut.

8. The method of claim 6, wherein the biasing spring causes the teeth on the lock ring to engage with the teeth on the nut.

9. A releasable lock nut assembly for securing a bearing on a threaded hub comprising:
   a thrust washer comprising:
      a disk portion, and
      a peripheral skirt extending axially away from the disk portion, the peripheral skirt having a plurality of openings that extend through the peripheral skirt, an integral hoop perimeter positioned away from the disk portion, a characteristic diameter measured as the minimum external diameter of the peripheral skirt at an axial location of the openings, and a internal envelope equal to the minimum inscribed diameter of the peripheral skirt that is evaluated at a position spaced apart from the disk portion of the thrust washer, wherein all of the peripheral skirt is positioned within the characteristic diameter; and
   a lock ring inserted into the thrust washer, the lock ring comprising teeth on a side of the lock ring and a plurality of tangs that extend beyond a lock ring major diameter such that the tangs fit within the openings of the thrust washer; and
   a biasing spring inserted into the thrust washer, the biasing spring forces the lock ring away from the disk portion of the thrust washer,
wherein the internal envelope of the peripheral skirt is larger than the major diameter of the lock ring and smaller than the plurality of tangs of the lock ring.

10. The releasable lock nut assembly of claim 9, further comprising a nut inserted into the thrust washer, the nut comprising a shoulder and an inner body, the shoulder having teeth on a side, the inner body extending axially from the shoulder and comprising threads along an inside and having a bearing face, wherein the teeth on the shoulder are positioned to engage the teeth on the lock ring, the threads are positioned to engage with the threaded hub, and the bearing face is positioned to apply a force to the disk portion of the thrust washer when the nut is tightened along the threaded hub.

* * * * *